(12) United States Patent
Caraccioli

(10) Patent No.: US 11,756,012 B2
(45) Date of Patent: Sep. 12, 2023

(54) DYNAMICALLY TRIGGERED AUTOMATIC RESOURCE DISTRIBUTION IDENTIFICATION AND POPULATION SYSTEM

(71) Applicant: BANK OF AMERICA CORPORATION, Charlotte, NC (US)

(72) Inventor: Angela Caraccioli, Phoenix, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 7 days.

(21) Appl. No.: 17/543,361

(22) Filed: Dec. 6, 2021

(65) Prior Publication Data

US 2023/0177475 A1   Jun. 8, 2023

(51) Int. Cl.
| | | |
|---|---|---|
| *G06Q 20/32* | (2012.01) | |
| *G06Q 20/38* | (2012.01) | |
| *H04L 29/06* | (2006.01) | |
| *G06Q 20/10* | (2012.01) | |
| *G06F 16/23* | (2019.01) | |
| *G06Q 40/06* | (2012.01) | |
| *G06Q 20/40* | (2012.01) | |

(Continued)

(52) U.S. Cl.
CPC ....... *G06Q 20/0855* (2013.01); *G06Q 20/385* (2013.01); *G06Q 20/42* (2013.01)

(58) Field of Classification Search
CPC ... G06Q 20/0855; G06Q 20/385; G06Q 20/42
See application file for complete search history.

(56) References Cited

U.S. PATENT DOCUMENTS

2009/0132405 A1 * 5/2009 Scipioni ............... G06Q 20/385
 705/35
2011/0276414 A1 * 11/2011 Subbarao ............. G06Q 20/102
 705/40

(Continued)

FOREIGN PATENT DOCUMENTS

WO    WO-2016166674 A1 * 10/2016

OTHER PUBLICATIONS

Apple (Safari User Guide), "Autofill credit card info in Safari on Mac," Nov. 2, 2021, retrieved from: https://web.archive.org/web/20211102135243/https://support.apple.com/guide/safari/autofill-credit-card-info-ibrw1103/mac (Year: 2021).*

(Continued)

*Primary Examiner* — Daniel S Felten
*Assistant Examiner* — Douglas W Pinsky
(74) *Attorney, Agent, or Firm* — Moore & Van Allen PLLC; Nicholas C. Russell

(57) ABSTRACT

Embodiments of the present invention provide a system for automatically identifying resource distribution and populating information associated with the resource distribution. The system is configured for monitoring user activity of a user on a user device, automatically identifying that the user is initiating resource distribution on a third party application based on monitoring the user activity of the user, generating and transmit a prompt to the user to confirm initiation of the resource distribution, receive an input from the user confirming the initiation of the resource distribution on the third party application, and automatically populate information associated with the resource distribution on the third party application.

20 Claims, 5 Drawing Sheets

(51) Int. Cl.
*G06Q 20/36* (2012.01)
*H04W 12/06* (2021.01)
*H04W 12/08* (2021.01)
*G06Q 20/24* (2012.01)
*G06Q 20/14* (2012.01)
*G06Q 40/03* (2023.01)
*G06Q 20/08* (2012.01)
*G06Q 20/42* (2012.01)
*H04W 4/14* (2009.01)
*G06F 21/45* (2013.01)
*G06F 21/31* (2013.01)
*G06Q 40/02* (2023.01)
*H04W 12/062* (2021.01)
*H04W 12/72* (2021.01)
*G06F 21/32* (2013.01)
*H04W 60/00* (2009.01)
*G06Q 20/34* (2012.01)
*G06F 3/0482* (2013.01)

(56) References Cited

U.S. PATENT DOCUMENTS

| | | | | |
|---|---|---|---|---|
| 2012/0173426 A1* | 7/2012 | Foster | ................ | G06Q 20/3223 |
| | | | | 705/44 |
| 2012/0173624 A1* | 7/2012 | Beerse | ................... | H04N 7/155 |
| | | | | 709/204 |
| 2013/0074003 A1* | 3/2013 | Dolenc | ................. | G06F 3/0485 |
| | | | | 715/781 |
| 2015/0052061 A1* | 2/2015 | Anderson | ............ | G06Q 20/409 |
| | | | | 705/44 |
| 2015/0339770 A1* | 11/2015 | Keithley | ............ | G06Q 30/0641 |
| | | | | 705/38 |
| 2016/0155160 A1* | 6/2016 | Walz | .................... | G06Q 20/409 |
| | | | | 705/26.1 |
| 2017/0278174 A1* | 9/2017 | Harrell | ............... | G06Q 30/0643 |
| 2019/0213659 A1* | 7/2019 | Shannon | ............ | G06Q 30/0631 |
| 2019/0230070 A1* | 7/2019 | Isaacson | .............. | H04W 12/084 |
| 2019/0281030 A1* | 9/2019 | Isaacson | ............. | H04L 63/0838 |
| 2020/0005219 A1* | 1/2020 | Stevens | ..................... | G06F 8/71 |
| 2020/0097934 A1* | 3/2020 | Grassadonia | ........ | G06Q 20/102 |
| 2020/0126085 A1* | 4/2020 | Roche | ................. | G06Q 20/102 |
| 2020/0136934 A1* | 4/2020 | Ding | ....................... | H04L 67/10 |
| 2020/0322320 A1* | 10/2020 | Moon | ..................... | H04L 51/02 |
| 2021/0160335 A1* | 5/2021 | Bellet | ..................... | G06F 9/543 |
| 2021/0192518 A1* | 6/2021 | Rule | ..................... | G06Q 20/351 |
| 2021/0256503 A1* | 8/2021 | Nguyen | ................ | G06F 40/174 |

OTHER PUBLICATIONS

Apple (iPhone User Guide), "Automatically fill in forms in Safari on iPhone," May 29, 2021, retrieved from: https://web.archive.org/web/20210529145544/https://support.apple.com/guide/iphone/automatically-fill-in-forms-iphccfb450b7/ios (Year: 2021).*

* cited by examiner

DYNAMICALLY TRIGGERED AUTOMATIC RESOURCE DISTRIBUTION IDENTIFICATION AND POPULATION SYSTEM

BACKGROUND

Conventional systems do not have the capability to identify initiation of resource distribution and automatically populate information associated with the resource distribution. As such, there exists a need for a system that automatically identifies initiation of resource distribution and populates information associated with the resource distribution.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for automatically identifying resource distribution and populating information associated with the resource distribution. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention monitors user activity of a user on a user device, automatically identifies that the user is initiating resource distribution on a third party application based on monitoring the user activity of the user, generates and transmits a prompt to the user to confirm initiation of the resource distribution, receives an input from the user confirming the initiation of the resource distribution on the third party application, and automatically populates information associated with the resource distribution on the third party application.

In some embodiments, the present invention monitors the user activity based on monitoring an entity application and one or more third party applications comprising the third party application.

In some embodiments, the present invention automatically identifies that the user is initiating the resource distribution on the third party application based on determining that the user copied at least a part of resource pool information associated with a resource pool of the user from the entity application to submit the resource pool information to the third party application.

In some embodiments, the present invention tokenizes the resource pool information after receiving the input from the user.

In some embodiments, the present invention transmits the tokenized resource pool information to the third party application for automatically populating the information associated with the resource distribution on the third party application.

In some embodiments, the present invention authenticates the user before transmitting the tokenized resource pool information to the third party application.

In some embodiments, the present invention generates and transmits a second prompt to the user to confirm adding the resource distribution to an automatic resource distribution list, receives a second input from the user confirming addition of the resource distribution to the automatic resource distribution list; and adds the resource distribution to the automatic resource distribution list.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
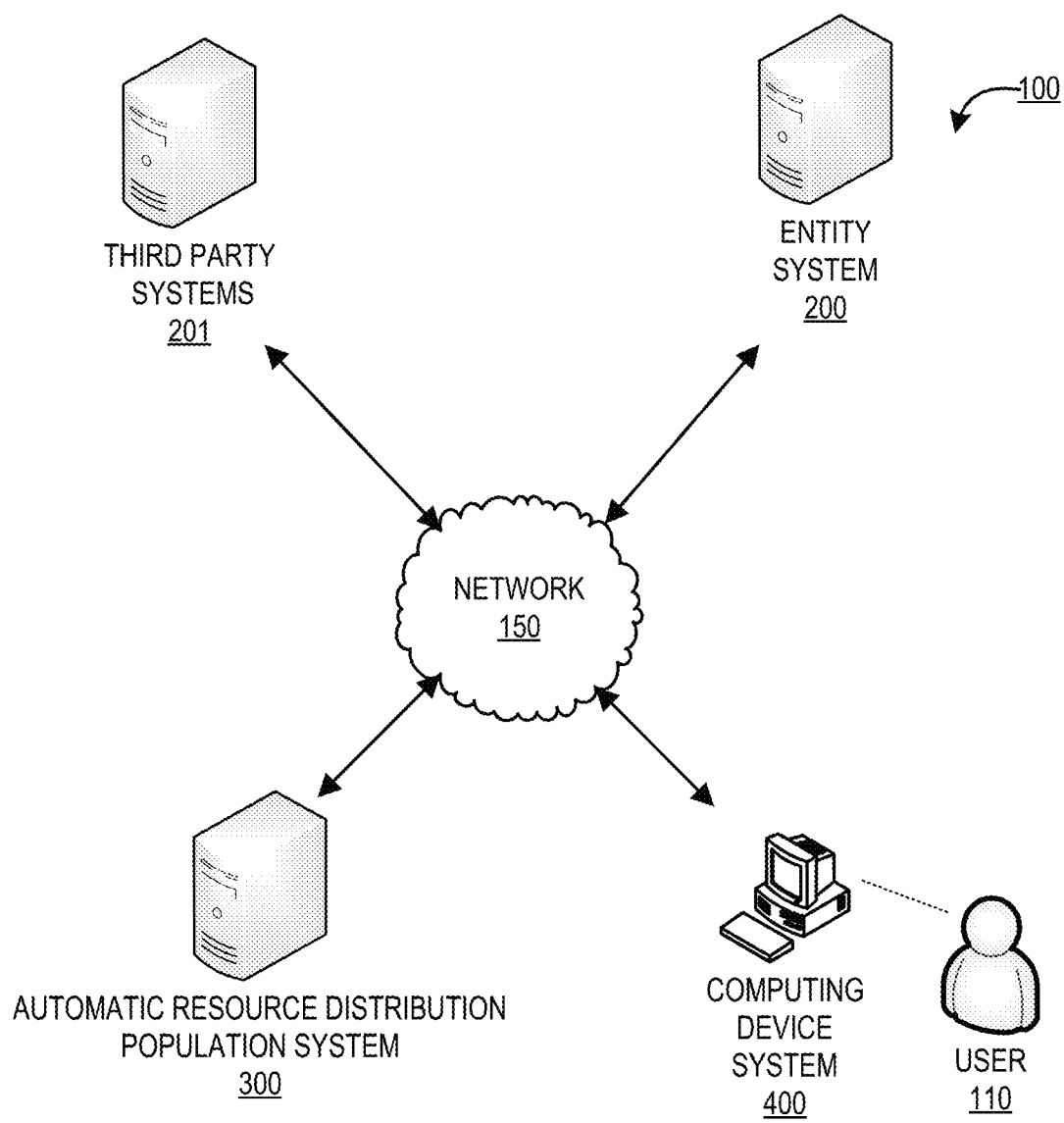
Figure 2:
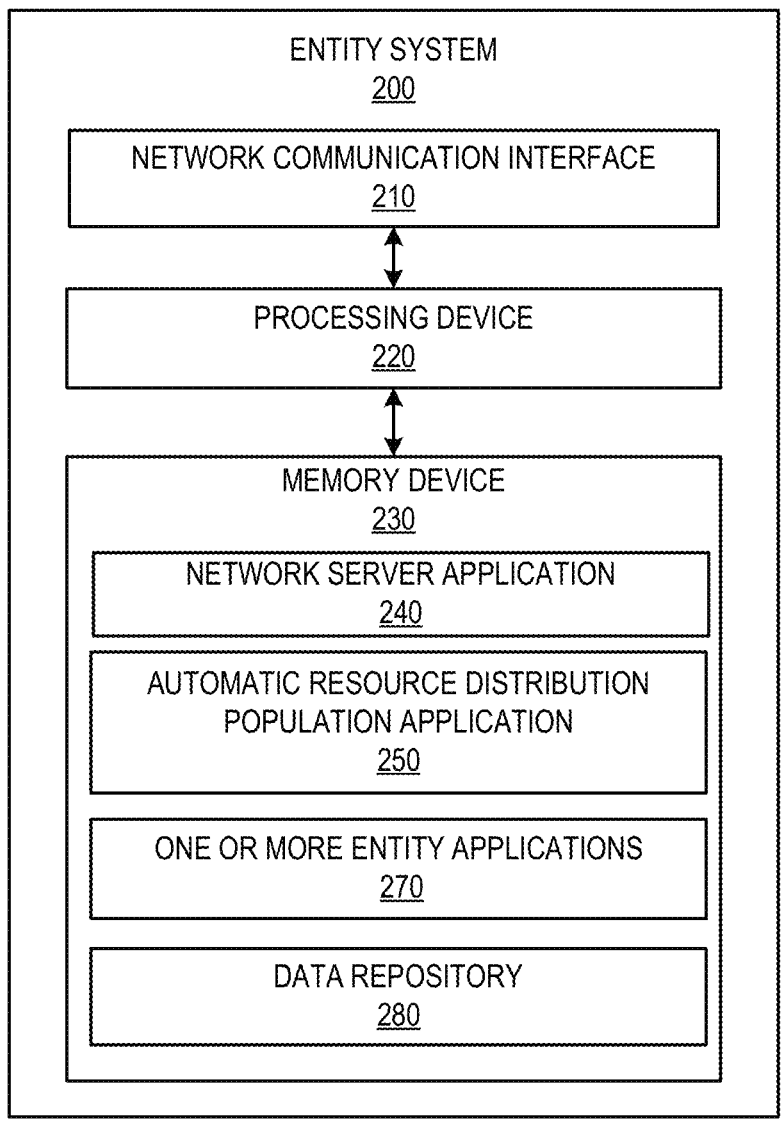
Figure 3:
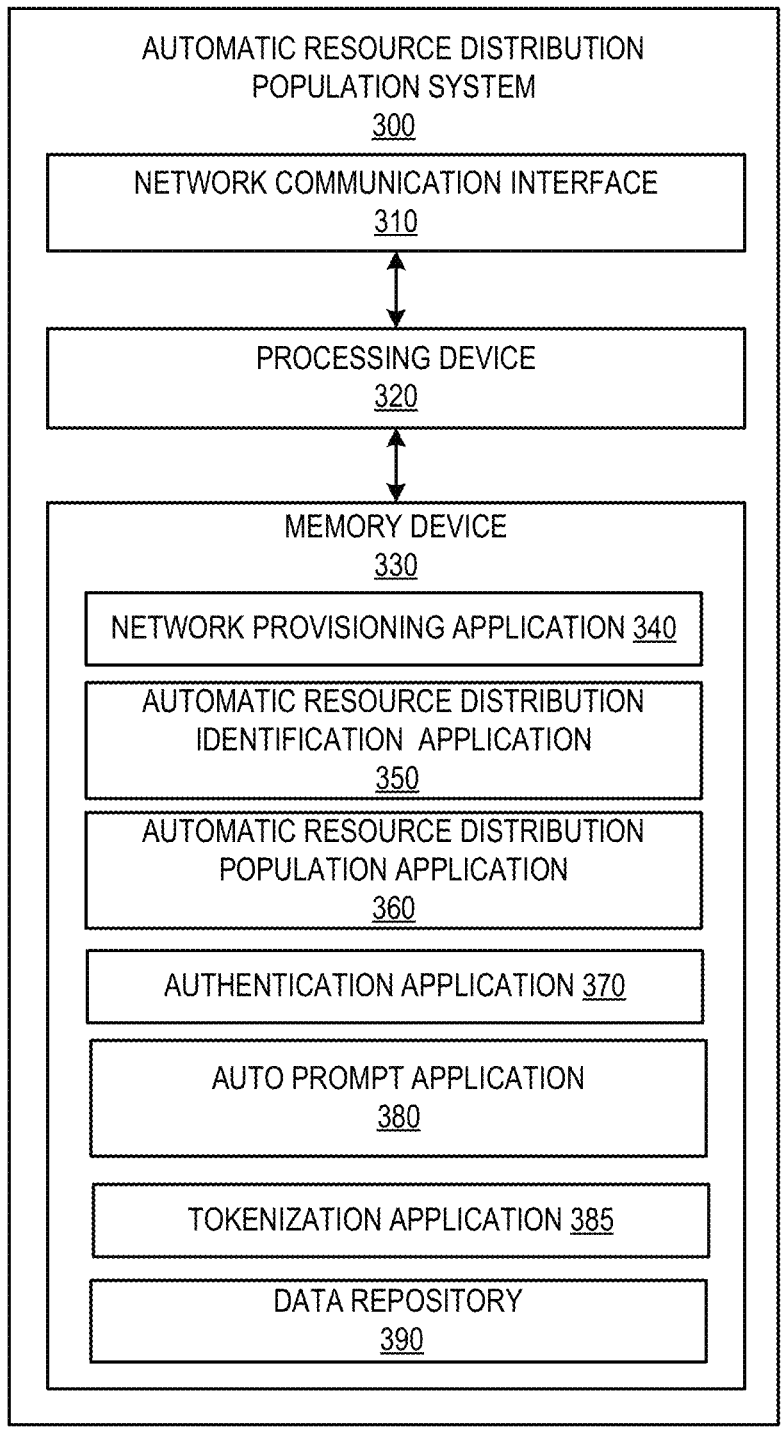
Figure 4:
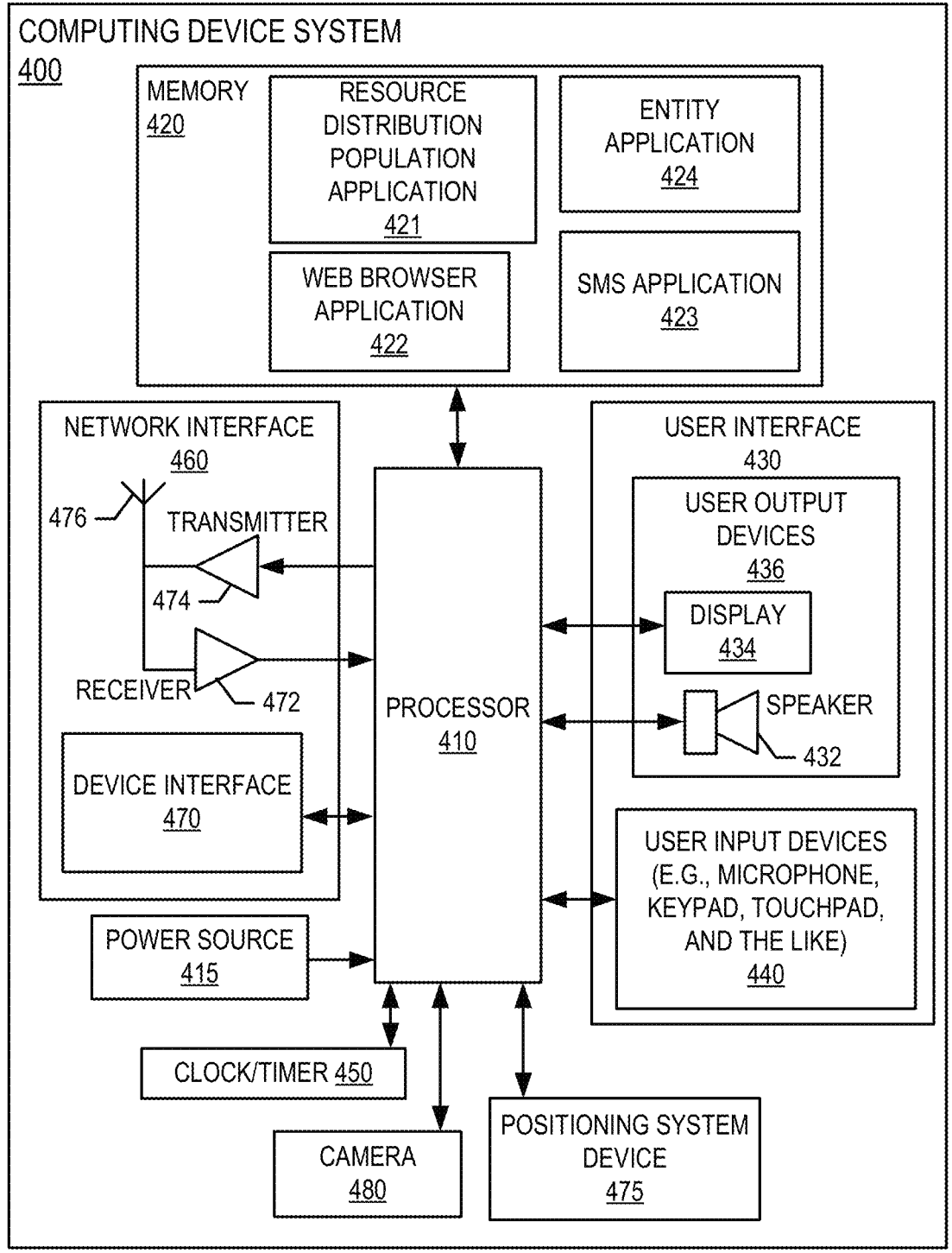
Figure 5:
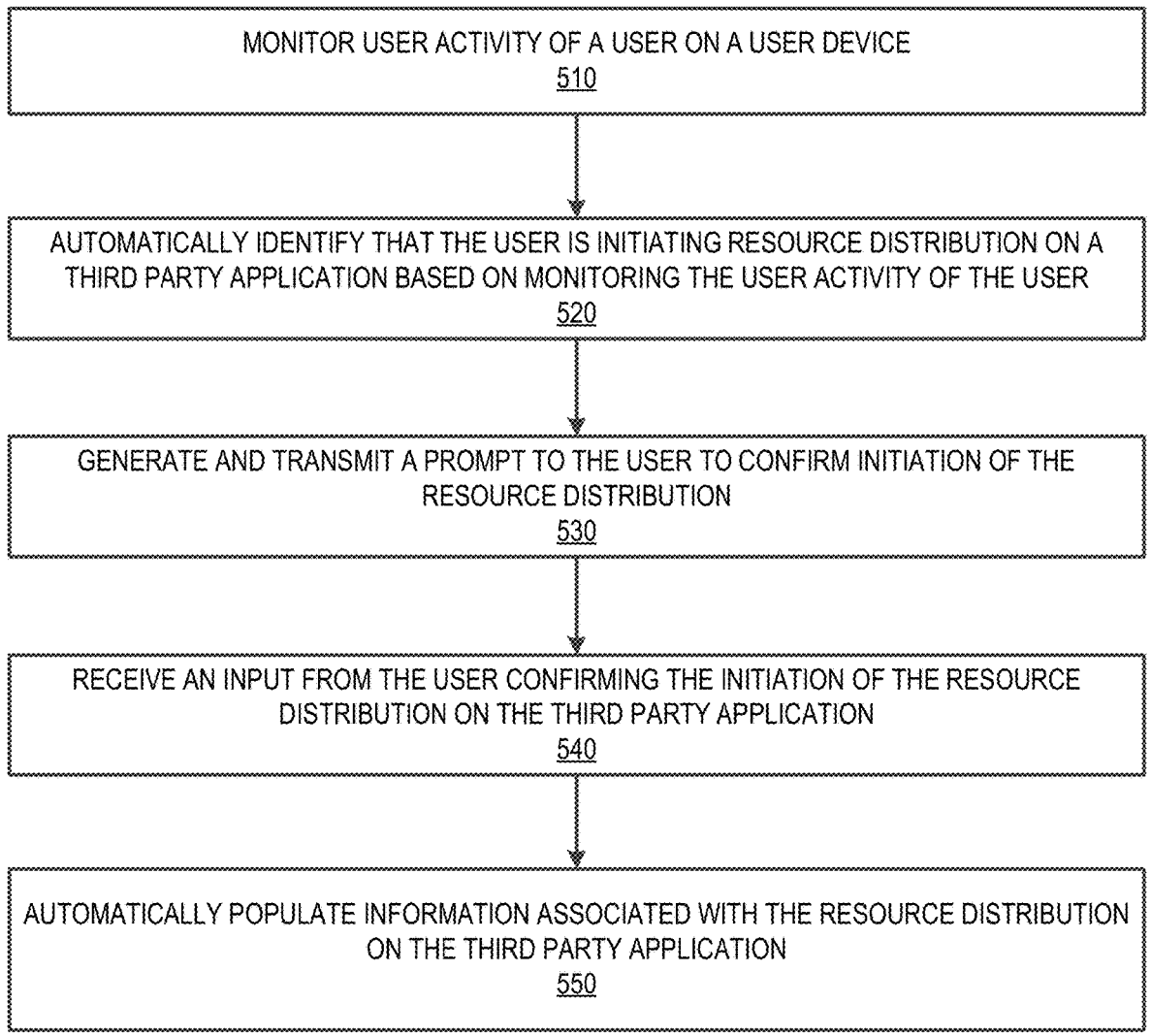

Having thus described embodiments of the invention in general terms, reference will now be made the accompanying drawings, wherein:

FIG. 1 provides a block diagram illustrating a system environment for automatically identifying resource distribution and populating information associated with the resource distribution, in accordance with an embodiment of the invention;

FIG. 2 provides a block diagram illustrating the entity system 200 of FIG. 1, in accordance with an embodiment of the invention;

FIG. 3 provides a block diagram illustrating an automatic resource distribution population system 300 of FIG. 1, in accordance with an embodiment of the invention;

FIG. 4 provides a block diagram illustrating the computing device system 400 of FIG. 1, in accordance with an embodiment of the invention; and FIG. 5 provides a process flow for automatically identifying resource distribution and populating information associated with the resource distribution, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In some embodiments, the entity may be a financial institution which may include any financial institutions such as commercial banks, thrifts, federal and state savings banks, savings and loan associations, credit unions, investment companies, insurance companies and the like. As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution. As used herein, the term "third party entity" may be any organization that provides goods, products, services, or the like to the users associated with the entity.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional systems do not allow a user to automatically transmit resource pool information (e.g., account number, routing number, or the like associated with a checking account, savings account, or the like) to a third party application. Typically, the user has to access the resource pool information from an entity application, copy each party of the resource pool information from the entity application, and paste the resource pool information in the third party application, thereby increasing the complexity of the process and decreasing the processing efficiency of a user device, entity systems, and third party entity systems, where the third party application and the entity application consume processing power of the user device, the entity systems, and the third party entity systems while the user is performing the steps of copying and pasting the resource pool information. As such, there exists a need for a system that automatically identifies initiation of resource distribution and populates information associated with the resource distribution. The system of the present invention solves this problem by automatically identifying initiation of resource distribution and dynamically triggering the auto-population of information associated with the resource distribution as explained in greater detail below.

FIG. 1 provides a block diagram illustrating a system environment 100 for automatically identifying resource distribution and populating information associated with the resource distribution, in accordance with an embodiment of the invention. As illustrated in FIG. 1, the environment 100 includes an automatic resource distribution population system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be customers or potential customers of an entity associated with the entity system 200.

The entity system(s) 200 may be any system owned or otherwise controlled by an entity to support or perform one or more process steps described herein. In some embodiments, the entity may be any organization that involves in financial transaction. In some embodiments, the entity is a financial institution. In some embodiments, the one or more third party systems 201 may be any systems associated with a third party entity that provides goods, products, services, or the like to the one or more users 110 associated with the entity. In some embodiments, the one or more third party systems may provide a third party application on the computing device system 400 associated with the one or more users 110, where the third party application allows the users 110 to purchase or acquire goods, products, services, or the like provided by the third party entity.

The automatic resource distribution population system 300 is a system of the present invention for performing one or more process steps described herein. In some embodiments, the automatic resource distribution population system 300 may be an independent system. In some embodiments, the automatic resource distribution population system 300 may be a part of the entity system 200.

The automatic resource distribution population system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the automatic resource distribution population system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the automatic resource distribution population system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an automatic resource distribution population application 250, one or more entity applications 270, and a data repository 280 comprising historical transaction data associated with one or more resource pools of users 110. The one or more entity applications 270 may be any applications developed, supported, maintained, utilized, and/or controlled by the entity that perform one or more organizational activities. In one embodiments, the entity application may be an online banking application. The computer-executable program code of the network server application 240, the automatic resource distribution population application 250, the one or more entity application 270 to perform certain logic, data-extraction, and data-storing functions of the entity system 200 described herein, as well as communication functions of the entity system 200.

The network server application 240, the automatic resource distribution population application 250, and the one or more entity applications 270 are configured to store data in the data repository 280 or to use the data stored in the data repository 280 when communicating through the network communication interface 210 with the automatic resource distribution population system 300, and/or the computing device system 400 to perform one or more process steps described herein. In some embodiments, the entity system 200 may receive instructions from the automatic resource distribution population system 300 via the automatic resource distribution population application 250 to perform certain operations. The automatic resource distribution population application 250 may be provided by the automatic resource distribution population system 300.

FIG. 3 provides a block diagram illustrating the automatic resource distribution population system 300 in greater detail, in accordance with embodiments of the invention. As illustrated in FIG. 3, in one embodiment of the invention, the automatic resource distribution population system 300 includes one or more processing devices 320 operatively coupled to a network communication interface 310 and a memory device 330. In certain embodiments, the automatic resource distribution population system 300 is operated by an entity, such as a financial institution. In some embodiments, the automatic resource distribution population system 300 is owned or operated by the entity of the entity system 200. In some embodiments, the automatic resource distribution population system 300 may be an independent system. In alternate embodiments, the automatic resource distribution population system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the automatic resource distribution population system 300 described herein. For example, in one embodiment of the automatic resource distribution population system 300, the memory device 330 includes, but is not limited to, a network provisioning application 340, an automatic resource distribution identification application 350, an automatic resource distribution population application 360, an authentication application 370, an auto prompt application 380, a tokenization application 385, and a data repository 390 comprising any data processed or accessed by one or more applications in the memory device 330. The computer-executable program code of the network provisioning application 340, the automatic resource distribution identification application 350, the automatic resource distribution population application 360, the authentication application 370, the auto prompt application 380, and the tokenization application 385 may instruct the processing device 320 to perform certain logic, data-processing, and data-storing functions of the automatic resource distribution population system 300 described herein, as well as communication functions of the automatic resource distribution population system 300.

The network provisioning application 340, the automatic resource distribution identification application 350, the automatic resource distribution population application 360, the authentication application 370, the auto prompt application 380, and the tokenization application 385 are configured to invoke or use the data in the data repository 390 when communicating through the network communication interface 310 with the entity system 200, and/or the computing device system 400. In some embodiments, the network provisioning application 340, the automatic resource distribution identification application 350, the automatic resource distribution population application 360, the authentication application 370, the auto prompt application 380, and the tokenization application 385 may store the data extracted or received from the entity system 200, and the computing device system 400 in the data repository 390. In some embodiments, the network provisioning application 340, the automatic resource distribution identification application 350, the automatic resource distribution population application 360, the authentication application 370, the auto prompt application 380, and the tokenization application 385 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a resource distribution population application 421, and an entity application 424. In some embodiments, the memory 420 may further comprise one or more third party application provided by the one or more third party entities. These applications also typically instructions to a graphical user interface (GUI) on the display 430 that allows the user 110 to interact with the entity system 200, the automatic resource distribution population system 300, and/or other devices or systems. The memory 420 of the computing device system 400 may comprise a Short Message Service (SMS) application 423 configured to send, receive, and store data, information, communications, alerts, and the like via a wireless telephone network. In some embodiments, the entity application 424 may be an online banking application. In some embodiments, the resource distribution population application 421 provided by the automatic resource distribution population system 300 allows the user 110 to access the automatic resource distribution population system 300. In some embodiments, the entity application 424 provided by the entity system 200 and the resource distribution population application 421 allow the user 110 to access the functionalities provided by the automatic resource distribution population system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for automatically identifying resource distribution and populating information associated with the resource distribution, in accordance with an embodiment of the invention. As shown in block 510, the system monitors user activity of a user on a user device. The user may be a customer of an entity associated with the system of the present invention, where the entity manages one or more resource pools of the user (e.g., savings account, checking account, or the like). The system monitors the user activity of the user by monitoring one or more third party applications and an entity application installed on the user device. The one or more third party applications may be applications provided by one or more third party entities that provide goods, products, services, or the like to the user, where the one or more third party applications allow the user to purchase the goods, services, services, or the like provided by the third party entity. The entity application may be any application provided by the entity to the user, where the entity application allows the user to manage one or more resource pools of the user. For example, the entity application may be an online banking application. In some embodiments, the system may monitor the user activity on the one or more third party applications and the entity application after receiving an approval from the user. In some embodiments, the system may monitor the user activity on the one or more third party applications and the entity application based on determining that the user has enrolled in an automatic population service provided by the system of the present invention.

As shown in block 520, the system automatically identifies that the user is initiating resource distribution on a third party application based on monitoring the user activity of the user. In some embodiments, the system may identify that the user initiating the resource distribution on the third party application based on determining that the user copied at least a part of resource pool information associated with a resource pool of the user from the entity application to submit the resource pool information to the third party application. For example, the system may identify that the user has copied routing number or the account number associated with a checking account from the online banking application and may determine that the user is initiating a transaction in the third party application. In some embodiments, the system may identify that the user is alternating between the third party application and the entity application and may determine that the user is initiating the resource distribution on the third party application.

As shown in block 530, the system generates and transmits a prompt to the user to confirm initiation of the resource distribution. Based on identifying that the user is initiating the resource distribution, the system may generate and transmit a prompt to the user device. In some embodiments, the prompt is displayed on a graphical user interface of the user device, via the entity application installed on the user device of the user. As shown in block 540, the system receives an input from the user confirming the initiation of the resource distribution on the third party application. For example, upon receiving the prompt, the user may select an option provided by the system in the prompt to confirm that the user is initiating a transaction in the third party application.

In response to receiving the input from the user, the system tokenizes the resource pool information after receiving the input from the user. For example, the system may tokenize the account number, the routing number, and the like associated with the checking account of the user. After tokenizing the resource pool information, the system transmits the tokenized resource pool information to the third party application. In some embodiments, the system after tokenizing the resource pool information, transmits the tokenized resource pool information to the third party application after authenticating the user. In some embodiments, the system may authenticate the user based on any of the available authentication methods. For example, the system may utilize facial recognition features present in the user device to authenticate the user. In another example, the system may utilize biometric data of the user to authenticate the user.

In some embodiments, the system in addition to the tokenization, may also mask the resource pool information. In some embodiments, the system may encrypt the account number, the routing number, or the like associated with the resource pool of the user.

As shown in block 550, the system automatically populates information associated with the resource distribution on the third party application. Based on transmitting the tokenized resource pool information, the system automatically populates the information associated with the resource distribution based on data present in the token. In some embodiments, the system may also transmit instructions to the third party application along with the tokenized resource pool information, where the instructions cause the third party application to automatically populate the information associated with resource distribution based on tokenized resource pool information present in the token.

In some embodiments, the system after completion of the auto-population step, generates and transmits a second prompt to the user to confirm adding the resource distribution to an automatic resource distribution list. In response to transmitting the second prompt, the system may receive a second input from the user confirming addition of the resource distribution to the automatic resource distribution list and may add the resource distribution to the automatic resource distribution list, where one or more resource distributions in the automatic resource distribution list will be automatically completed by the system and/or the entity system at a scheduled time.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automatically identifying resource distribution and populating information associated with the resource distribution, the system comprising:
   at least one network communication interface;
   at least one non-transitory storage device; and
   at least one processing device coupled to the at least one non-transitory storage device and the at least one network communication interface, wherein the at least one processing device is configured to:
      monitor user activity of a user on a user device;
      determine that the user is alternating between an entity application provided by an entity and a third party application associated with a third party entity based on monitoring the user activity of the user, wherein the entity manages one or more resource pools of the user and the third party entity provides at least one of goods, services, and products to the user;
      automatically identify that the user is initiating resource distribution on a third party application based on determining that the user is alternating between the entity application and the third party application;
      generate and transmit a prompt to the user to confirm initiation of the resource distribution;

receive an input from the user confirming the initiation of the resource distribution on the third party application; and transmit instructions to the third party application that cause the third party application to automatically populate information associated with the resource distribution on the third party application.

2. The system of claim 1, wherein the at least one processing device is configured to monitor the user activity based on monitoring the entity application and one or more third party applications comprising the third party application.

3. The system of claim 2, wherein the at least one processing device is configured to automatically identify that the user is initiating the resource distribution on the third party application based on determining that the user copied at least a part of resource pool information associated with a resource pool of the one or more resource pools of the user from the entity application to submit the resource pool information to the third party application.

4. The system of claim 3, wherein the at least one processing device is configured to tokenize the resource pool information after receiving the input from the user.

5. The system of claim 4, wherein the at least one processing device is further configured to transmit the tokenized resource pool information to the third party application for automatically populating the information associated with the resource distribution on the third party application.

6. The system of claim 5, wherein the at least one processing device is configured to authenticate the user before transmitting the tokenized resource pool information to the third party application.

7. The system of claim 1, wherein the at least one processing device is configured to:
generate and transmit a second prompt to the user to confirm adding the resource distribution to an automatic resource distribution list;
receive a second input from the user confirming addition of the resource distribution to the automatic resource distribution list; and
add the resource distribution to the automatic resource distribution list.

8. A computer program product for automatically identifying resource distribution and populating information associated with the resource distribution, the computer program product comprising a non-transitory computer-readable storage medium having computer executable instructions for causing a computer processor to perform the steps of:
determining that the user is alternating between an entity application provided by an entity and a third party application associated with a third party entity based on monitoring the user activity of the user, wherein the entity manages one or more resource pools of the user and the third party entity provides at least one of goods, services, and products to the user;
monitoring user activity of a user on a user device;
automatically identifying that the user is initiating resource distribution on a third party application based on determining that the user is alternating between the entity application and the third party application;
generating and transmit a prompt to the user to confirm initiation of the resource distribution;
receive an input from the user confirming the initiation of the resource distribution on the third party application; and transmitting instructions to the third party application that cause the third party application to automatically populate information associated with the resource distribution on the third party application.

9. The computer program product of claim 8, wherein the computer executable instructions cause the computer processor to perform the step of monitoring the user activity based on monitoring the entity application and one or more third party applications comprising the third party application.

10. The computer program product of claim 9, wherein the computer executable instructions cause the computer processor to perform the step of automatically identifying that the user is initiating the resource distribution on the third party application based on determining that the user copied at least a part of resource pool information associated with a resource pool of the one or more resource pools of the user from the entity application to submit the resource pool information to the third party application.

11. The computer program product of claim 10, wherein the computer executable instructions cause the computer processor to perform the step of tokenizing the resource pool information after receiving the input from the user.

12. The computer program product of claim 11, wherein the computer executable instructions cause the computer processor to perform the step of transmitting the tokenized resource pool information to the third party application for automatically populating the information associated with the resource distribution on the third party application.

13. The computer program product of claim 12, wherein the computer executable instructions cause the computer processor to perform the step of authenticating the user before transmitting the tokenized resource pool information to the third party application.

14. The computer program product of claim 8, wherein the computer executable instructions cause the computer processor to perform the steps of:
generating and transmitting a second prompt to the user to confirm adding the resource distribution to an automatic resource distribution list;
receiving a second input from the user confirming addition of the resource distribution to the automatic resource distribution list; and
adding the resource distribution to the automatic resource distribution list.

15. A computer implemented method for automatically identifying resource distribution and populating information associated with the resource distribution, wherein the method comprises:
monitoring user activity of a user on a user device;
determining that the user is alternating between an entity application provided by an entity and a third party application associated with a third party entity based on monitoring the user activity of the user, wherein the entity manages one or more resource pools of the user and the third party entity provides at least one of goods, services, and products to the user;
automatically identifying that the user is initiating resource distribution on a third party application based on determining that the user is alternating between the entity application and the third party application;
generating and transmit a prompt to the user to confirm initiation of the resource distribution;
receive an input from the user confirming the initiation of the resource distribution on the third party application; and transmitting instructions to the third party application that cause the third party application to automatically populate information associated with the resource distribution on the third party application.

16. The computer implemented method of claim 15, wherein monitoring the user activity comprises monitoring the entity application and one or more third party applications comprising the third party application.

17. The computer implemented method of claim 16, wherein automatically identifying that the user is initiating the resource distribution on the third party application comprises automatically identifying that the user is initiating the resource distribution on the third party application based on determining that the user copied at least a part of resource pool information associated with a resource pool of the one or more resource pools of the user from the entity application to submit the resource pool information to the third party application.

18. The computer implemented method of claim 17, wherein the method further comprises tokenizing the resource pool information after receiving the input from the user.

19. The computer implemented method of claim 18, wherein the method further comprises transmitting the tokenized resource pool information to the third party application for automatically populating the information associated with the resource distribution on the third party application.

20. The computer implemented method of claim 19, wherein the method further comprises authenticating the user before transmitting the tokenized resource pool information to the third party application.

* * * * *